United States Patent
Kobata et al.

(10) Patent No.: US 11,585,389 B2
(45) Date of Patent: Feb. 21, 2023

(54) TRIPOD CONSTANT-VELOCITY JOINT

(71) Applicants: TOYOTA JIDOSHA KABUSHIKI KAISHA, Toyota (JP); JTEKT CORPORATION, Osaka (JP)

(72) Inventors: Keishi Kobata, Anjo (JP); Yosei Ando, Toyohashi (JP)

(73) Assignees: TOYOTA JIDOSHA KABUSHIKI KAISHA, Toyota (JP); JTEKT CORPORATION, Osaka (JP)

(*) Notice: Subject to any disclaimer, the term of this patent is extended or adjusted under 35 U.S.C. 154(b) by 357 days.

(21) Appl. No.: 16/875,582

(22) Filed: May 15, 2020

(65) Prior Publication Data
US 2020/0362921 A1    Nov. 19, 2020

(30) Foreign Application Priority Data
May 17, 2019   (JP) .............................. JP2019-094069

(51) Int. Cl.
*F16D 3/205*   (2006.01)
*F16D 3/202*   (2006.01)

(52) U.S. Cl.
CPC .... *F16D 3/2055* (2013.01); *F16D 2003/2023* (2013.01); *F16D 2003/2026* (2013.01); *Y10S 464/905* (2013.01)

(58) Field of Classification Search
CPC ........... F16D 3/2055; F16D 2003/2023; F16D 2003/2026; Y10S 464/905
USPC ......................................... 464/111, 123, 124
See application file for complete search history.

(56) References Cited

U.S. PATENT DOCUMENTS

| | | | | |
|---|---|---|---|---|
| 6,431,986 B2* | 8/2002 | Olszewski | ............ | F16D 3/2055 464/111 |
| 6,958,016 B2* | 10/2005 | Hofmann | .............. | F16D 3/2055 464/111 |
| 2016/0201731 A1 | 7/2016 | Kobata | | |

FOREIGN PATENT DOCUMENTS

| | | |
|---|---|---|
| JP | 2011163411 A | 8/2011 |
| JP | 2016130533 A | 7/2016 |

\* cited by examiner

*Primary Examiner* — Greg Binda
(74) *Attorney, Agent, or Firm* — Hunton Andrews Kurth LLP

(57) ABSTRACT

A tripod constant-velocity joint including: an inner ring; three trunnions protruding from the inner ring; three roller units supported by the trunnions; and an outer ring storing the roller units. Each roller unit includes: an inner roller that is in contact with a convex outer-circumferential surface of the corresponding trunnion at a tangent point; an outer roller supported by the inner roller through rolling elements that are interposed between the inner and outer rollers; and a limiting portion protruding from the outer roller, so as to limit movements of the rolling elements and the inner roller. A clearance between the inner roller and the limiting portion is smaller than an axial length of a crowned end portion of each rolling element, and is larger than a stroke distance of reciprocating movement of the tangent point when a joint angle of the tripod constant-velocity joint is a predetermined value.

3 Claims, 4 Drawing Sheets

COMPARATIVE EXAMPLE

TRIPOD CONSTANT-VELOCITY JOINT

This application claims priority from Japanese Patent Application No. 2019-094069 filed on May 17, 2019, the disclosure of which is herein incorporated by reference in its entirety.

FIELD OF THE INVENTION

The present invention relates to a tripod constant-velocity joint capable of reducing a compelling force without reducing a durability of the constant-velocity joint.

BACKGROUND OF THE INVENTION

There is known a tripod constant-velocity joint that includes: an inner ring attached to a leg shaft; three trunnions protruding from the inner ring toward an outer peripheral side of the inner ring and having respective convex outer-circumferential surfaces; three roller units rotatably supported by the respective three trunnions; and a outer ring accommodating the three roller units, wherein the inner ring is disposed in the outer ring such that the inner ring is unrotatable relative to the outer ring and is movable relative to the outer ring in a direction of a rotation axis about which the outer ring is to be rotated. An example of such a tripod constant-velocity joint is disclosed in JP-2011-163411A.

SUMMARY OF THE INVENTION

By the way, in the above-described tripod constant-velocity joint, a tangent point at which the convex outer-circumferential surface of each of the three trunnions is in contact with a corresponding one of the roller units, is displaced in a trunnion protruding direction (in which the trunnion protrudes from the inner ring), with change of a joint angle corresponding to an angle that is defined by a rotation axis of the leg shaft (inner ring) and the rotation axis of the outer ring. Each of the roller units is constituted by an inner roller, an outer roller and a plurality of needles that are interposed between the inner and outer rollers in a radial direction, wherein the plurality of needles serve as rolling elements. The outer roller includes a radially inward flange portion provided in its axial end portion that is on a side of a distal end of a corresponding one of the trunnions. A snap ring is provided in another axial end portion of the outer roller that is on a side of a proximal end of the corresponding one of the trunnions. The radially inward flange portion and the snap ring, which are provided in the respective axial end portions of the outer roller, cooperate with each other to limit movements of the needles and the inner roller relative to the outer roller.

However, depending on the change of the joint angle corresponding to the angle that is defined by the rotation axis of the leg shaft (inner ring) and the rotation axis of the outer ring, a clearance between the inner and outer rollers on the side of the distal end of the trunnion is eliminated whereby the inner roller is brought into contact with the radially inward flange portion of the outer roller, so that there is a possibility of reduction of a durability of the constant-velocity joint due to a compelling force generated as a result of the elimination of the clearance.

The present invention was made in view of the background art described above. It is therefore an object of the present invention to provide a tripod constant-velocity joint having a high durability by restraining generation of a compelling force due to change of a joint angle.

The above object is achieved according to the following feature of the present invention.

According to the feature of the invention, there is provided a tripod constant-velocity joint including (a) an inner ring attached to a leg shaft; (b) three trunnions protruding from the inner ring toward an outer peripheral side of the inner ring, each of the three trunnions having a convex outer-circumferential surface; (c) three roller units rotatably supported by the respective three trunnions; and (d) a outer ring storing the three roller units. The inner ring is disposed in the outer ring such that the inner ring is unrotatable relative to the outer ring and is movable relative to the outer ring in a direction of an outer ring axis about which the outer ring is to be rotated. Each of the three roller units includes: (c-1) an inner roller slidably fitted at an inner circumferential surface thereof on the convex outer-circumferential surface of a corresponding one of the three trunnions, such that the inner circumferential surface of the inner roller and the convex outer-circumferential surface of the corresponding one of the three trunnions are in contact with each other at a tangent point that is to be reciprocatively moved during rotation of the tripod constant-velocity joint; (c-2) a plurality of cylindrical rolling elements each including a crowned end portion in an axial end portion thereof; (c-3) an outer roller supported by the inner roller through the plurality of cylindrical rolling elements that are interposed between the inner roller and the outer roller; and (c-4) a limiting portion provided integrally in the outer roller and protruding from the outer roller toward an inner peripheral side of the outer roller, so as to limit movements of the plurality of cylindrical rolling elements and the inner roller. The inner roller and the limiting portion cooperate to define therebetween a clearance in a direction of a center line of a corresponding one of the three trunnions, such that the clearance is smaller than an axial length of the crowned end portion of each of the plurality of cylindrical rolling elements, and is larger than a stroke distance of reciprocating movement of the tangent point when a joint angle of the tripod constant-velocity joint is a predetermined value. The joint angle of the tripod constant-velocity joint is an angle between the outer ring axis and an inner ring axis about which the inner ring is to be rotated. Further, for example, each of the three roller units further includes, in addition to the limiting portion as a first limiting portion, a second limiting portion provided to protrude from the outer roller toward the inner peripheral side of the outer roller and spaced apart from the first limiting portion by a predetermined spacing distance in an axial direction of the outer roller, wherein the second limiting portion cooperates with the first limiting portion to limit the movements of the plurality of cylindrical rolling elements and the inner roller that are located between the first and second limiting portions in the axial direction of the outer roller, and wherein the clearance corresponds to a value obtained by subtracting an axial length of the inner roller from the predetermined spacing distance between the first and second limiting portions.

In the tripod constant-velocity joint constructed as described above, the clearance between the inner roller and the limiting portion in the direction of the center line of the corresponding one of the three trunnions, is smaller than the axial length of the crowned end portion of each of the plurality of cylindrical rolling elements, and is larger than the stroke distance of the reciprocating movement of the tangent point (at which the inner roller and the corresponding one of the three trunnions are in contact with each other) when the joint angle is the predetermined value. Owing to this feature, the inner roller is not brought into contact with the limiting portion and accordingly the inner roller is restrained from being brought into contact at its edge portion with rolling surfaces of the respective rolling elements. It is therefore possible to retrain a compelling force applied from the inner roller and to provide the constant velocity joint with a high durability.

Preferably, the clearance between the inner roller and the limiting portion of a corresponding one of the three trunnions in the direction of the center line of the corresponding one of the three trunnions, is smaller than the stroke distance of reciprocating movement of the tangent point when the joint angle is 10 degrees. Owing to this feature, the clearance can be set to a value within an appropriate range.

Preferably, the predetermined value of the joint angle is a normal angle value that is a value of the joint angle in the most frequent case in a practical use of the tripod constant-velocity joint. For example, the predetermined value of the joint angle is 6 degrees. Owing to this feature, the clearance between the inner roller and the limiting portion of a corresponding one of the three trunnions in the direction of the center line of the corresponding one of the three trunnions, is set to a value larger than the stroke distance of reciprocating movement of the tangent point when the joint angle is the normal angle value, so that the inner roller is not brought into contact at its axial end surface with columnar-shaped outer circumferential surfaces of the respective rolling elements at least when the joint angle is the normal angle value, thereby making it possible to avoid a stress concentration on the rolling surface of any of the rolling elements, which could be caused by contact of the edge of the inner roller with the rolling surface.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
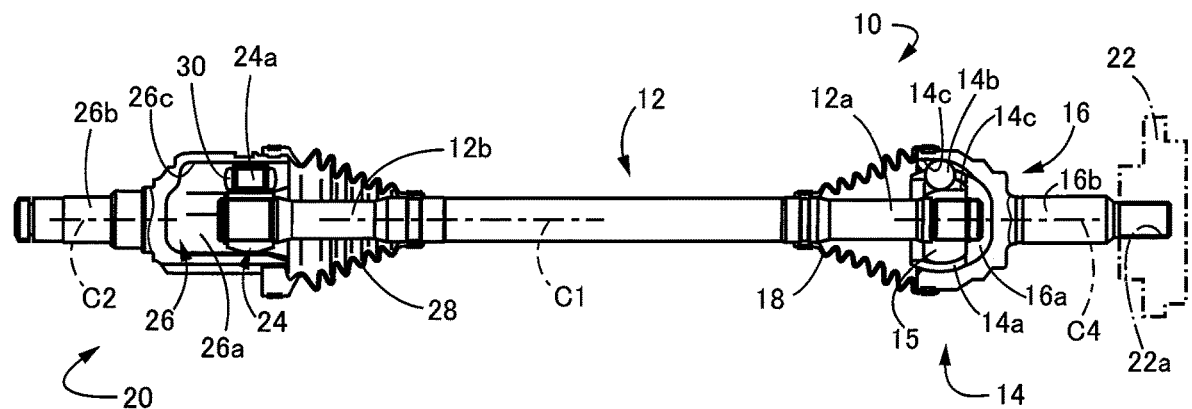
FIG. 1 is a front view showing a vehicle drive-force transmitting shaft to which a tripod constant-velocity joint is applied, wherein the tripod constant-velocity joint is constructed according to an embodiment of the present invention.

FIG. 1 is a view schematically showing a vehicle drive shaft 10 to which a constant velocity joint is applied, wherein the tripod constant-velocity joint is constructed according to an embodiment of the present invention. The vehicle drive shaft 10 of FIG. 1 is, for example, a front drive shaft that is to be provided in a front portion of a FF vehicle such that the front drive shaft extends in a width direction of the FF vehicle. The vehicle drive shaft 10 is constituted mainly by, for example, an intermediate shaft (leg shaft) 12 made of a carbon steel for machine structure and a pair of constant velocity joints 14, 20 that are fixed to respective axially opposite end portions of the intermediate shaft 12.

The constant velocity joint 14, which is one of the pair of constant velocity joints 14, 20, is provided in one of the axially opposite end portions of the intermediate shaft 12, wherein the one of the axially opposite end portions is located in an outer side portion of the vehicle. The constant velocity joint 14 consists of a Birfield constant-velocity joint, and is connected to a hub 22 to which a front wheel (not shown) as a drive wheel of the vehicle is fixed. On the other hand, the constant velocity joint 20, which is another one of the pair of constant velocity joints 14, 20, is provided in another one of the axially opposite end portions of the intermediate shaft 12, wherein the other one of the axially opposite end portions is located in an inner side portion of the vehicle. The constant velocity joint 20 consists of a sliding tripod constant-velocity joint, and is connected to a side gear of a final speed-reduction device (not shown). Thus, the vehicle drive shaft 10 is configured to transmit a drive force that is outputted from the final speed-reduction device included in a transaxle (not shown), to the front wheel as the drive wheel of the vehicle, for example.

The constant velocity joint 14 consisting of the Birfield constant-velocity joint includes an inner ring 15 fitted on an end portion 12a of the intermediate shaft 12 and a outer ring 16 defining therein a storing room 16a in which the inner ring 15 is stored. The end portion 12a corresponds to the above-described one of axially opposite end portions of the intermediate shaft 12, wherein the one of the axially opposite end portions is located in the outer side portion of the vehicle. The outer ring 16 is to be rotated about its rotation axis C4, and includes a connecting shaft 16b that extends in a direction of the rotation axis C4 so as to be fitted in a fitting hole 22a provided in the hub 22 such that the connecting shaft 16b is unrotatable relative to the hub 22. The connecting shaft 16b has spline teeth provided on an outer circumferential surface of its axial end portion, so that the connecting shaft 16b is splined to the fitting hole 22a in which spline teeth are provided on its inner circumferential surface.

Between the above-described inner and outer rings 15, 16, there are provided a substantially cylindrical cage 14a and a plurality of balls 14*b*, such that the balls 14*b* are held in respective ball holding holes that are provided in the cage 14*a*. A plurality of guide grooves 14*c* are provided in each of an outer circumferential surface of the inner ring 15 and an inner circumferential surface of the outer ring 16 and extend in a direction of axes of the inner and outer rings 15, 16, so that the balls 14*b* are fitted in the respective guide grooves 14*c* and guided by the respective guide grooves 14*c*. Owing to this arrangement, each of the outer ring 16 and the hub 22 is allowed to be pivoted or have a circular motion within a certain range about the above-described the above-described one of the axially opposite end portions of the intermediate shaft 12 which is located in the outer side portion of the vehicle.

An opening between the end portion 12*a* of the intermediate shaft 12 and the outer ring 16 is covered by a bellows-like tapered boot 18 that is made of a synthetic rubber formed of a soft resin. The boot 18 is fitted at its large-diameter end portion on an outer circumferential surface of the outer ring 16, and is fitted at its small-diameter end portion on an outer circumferential surface of the intermediate shaft 12. The boot 18 has an inner portion that is filled with a lubricating grease.

The constant velocity joint 20 consisting of the sliding tripod constant-velocity joint includes an inner ring 24 fitted on another end portion 12*b* of the intermediate shaft 12 and a outer ring 26 defining therein a storing room 26*a* in which the inner ring 24 is stored. The other end portion 12*b* corresponds to the above-described other of the axially opposite end portions of the intermediate shaft 12, wherein the above-described other of the axially opposite end portions is located in the inner side portion of the vehicle. The outer ring 26 is to be rotated about its rotation axis (outer ring axis) C2, and includes a connecting shaft 26*b* that extends in a direction of the rotation axis C2 so as to be fitted in a splined fitting hole provided in a center of the above-described side gear of the final speed-reduction device such that the connecting shaft 26*b* is unrotatable relative to the side gear of the final speed-reduction device.

Figure 2:
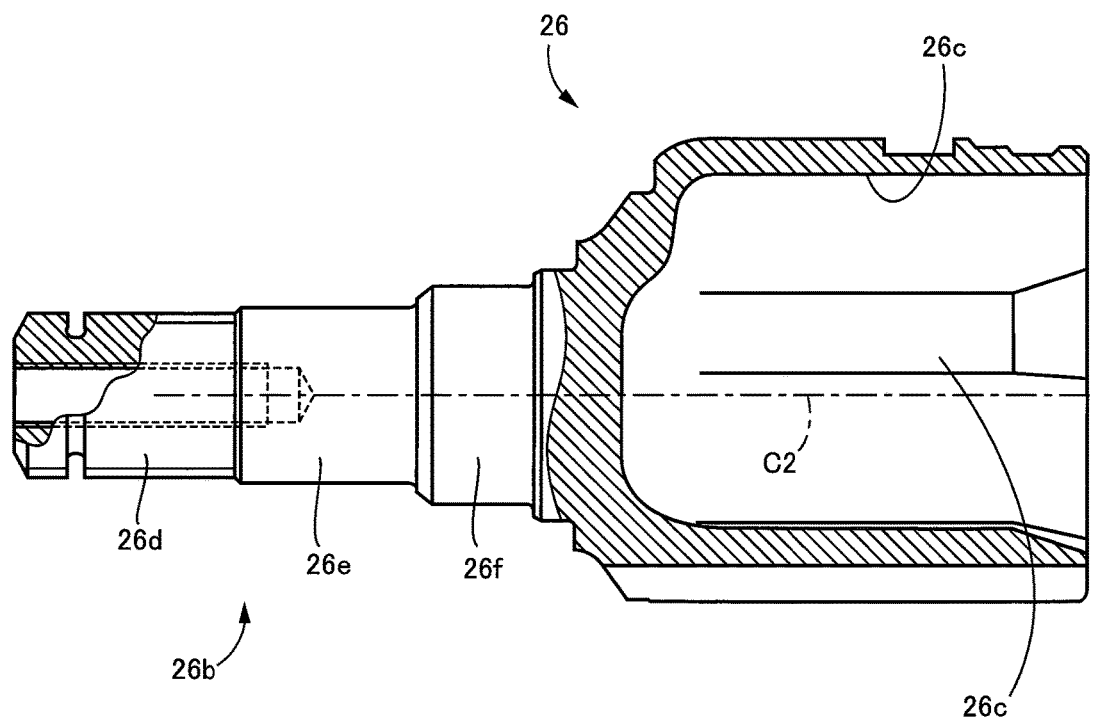
FIG. 2 is a partially cross sectional view showing a outer ring that constitutes a part of the tripod constant-velocity joint shown in FIG. 1.

FIG. 2 is a partially cross sectional view showing, in enlargement, the outer ring 26 of the constant velocity joint 20. As shown in FIG. 2, the connecting shaft 26*b*, which extends from a main body of the outer ring 26 in the direction of the rotation axis C2, includes a splined shaft portion 26*d* provided with splined teeth, a fitting shaft portion 26*e* which is contiguous to the splined shaft portion 26*d* and which has a diameter larger than a diameter of the splined shaft portion 26*d*, and a large-diameter shaft portion 26*f* which is contiguous to the fitting shaft portion 26*e* and which has a diameter larger than a diameter of the fitting shaft portion 26*e*. The fitting shaft portion 26*e* is slidably fitted in a differential casing (not shown) of the above-described final speed-reduction device, so as to be supported by the differential casing.

The inner ring 24 is provided with three trunnions (protrusions) 24*a* which are equi-angularly arranged in a circumferential direction of the inner ring 24 and which protrude toward an outer peripheral side of the inner ring 24, so as to support three roller units 30. The three roller units 30 are received in respective three guide slots 26*c* that are provided in an inner circumferential surface of the outer ring 26. Each of the three guide slots 26*c* is elongated in a direction parallel to the rotation axis C2 so as to guide a corresponding one of the three roller units 30 in the direction parallel to the rotation axis C2. With the three roller units 30 being received in the respective three guide slots 26*c*, the inner ring 24 is disposed in the outer ring 26 such that the inner ring 24 is unrotatable relative to the outer ring 26 about the rotation axis C2 and is movable relative to the outer ring 26 in the direction of the rotation axis C2.

An opening between the end portion 12*b* of the intermediate shaft 12 and the outer ring 16 is covered by a bellows-like tapered boot 28 that is made of a synthetic rubber formed of a soft resin. The boot 28 is fitted at its large-diameter end portion on the outer circumferential surface of the outer ring 16, and is fitted at its small-diameter end portion on the outer circumferential surface of the intermediate shaft 12. The boot 28 has an inner portion that is filled with a lubricating grease.

Figure 3:
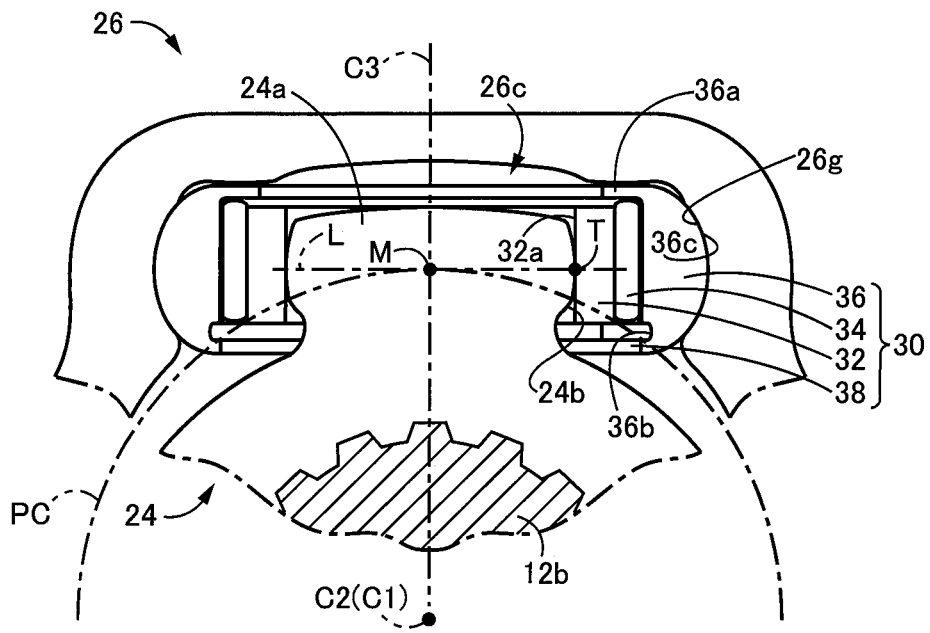
FIG. 3 is a view showing a cross section of the tripod constant-velocity joint shown in FIG. 1, wherein the view is as seen from a left side of FIG. 1 and the cross section contains a center line of a trunnion that is included in the tripod constant-velocity joint.

FIG. 3 is a cross sectional view showing each of the three guide slots 26*c* which receives a corresponding one of the three roller units 30 therein so as to guide the corresponding one of the three roller units 30 in the direction parallel to the rotation axis C2. As shown in FIG. 3, each of the inner and outer rings 24, 26 is allowed to be rotated or pivoted relative to the other of the inner and outer rings 24, 26 in a plane containing a corresponding one of the rotation axes C1, C2 of the respective inner and outer rings 24, 26, within a certain range of a joint angle θ, about the above-described other end portion 12*b* of the intermediate shaft 12, wherein the other end portion 12*b* of the intermediate shaft 12 is located in the inner side portion of the vehicle, and is splined to the inner ring 24 unrotatably relative to the inner ring 24.

The three trunnions 24*a* are equi-angualrly arranged in the circumferential direction of the inner ring 24, and protrude toward the outer peripheral side of the inner ring 24. In other words, each of the trunnions 24*a* protrudes in a direction of its center line C3 away from the rotation axis C1 of the inner ring 24 toward the outer peripheral side of the inner ring 24. Further, each of the trunnions 24*a* has a convex outer-circumferential surface 24*b* that is a part-spherical surface convexed in a radial direction perpendicular to the center line C3. Each of the roller units 30 is fitted on the convex outer-circumferential surface 24*b* of a corresponding one of the trunnions 24*a*, such that the convex outer-circumferential surface 24*b* is inscribed in a cylindrical inner circumferential surface 32*a* of an inner roller 32 of the roller units 30. Each of the roller units 30 includes the inner roller 32, a plurality of columnar or cylindrical rolling elements (needles) 34, an annular outer roller 36 and a snap ring 38. The inner roller 32 has the cylindrical inner circumferential surface 32*a* that is slidably fitted on the convex outer-circumferential surface 24*b* of a corresponding one of the trunnions 24*a*. The outer roller 36 is supported by the inner roller 32 through the plurality of cylindrical rolling elements 34 that are interposed between the inner and outer rollers 32, 36 in a radial direction of the roller units 30.

The outer roller 36 includes a flange portion 36*a* serving as a limiting portion for limiting movements of the plurality of the cylindrical rolling elements 34 and the inner roller 32 relative to the outer roller 36 in an axial direction of the outer roller 36. The outer roller 36 has an annular groove 36*b* provided in its inner circumferential surface, and the snap ring 38 is fitted in the annular groove 36*b*. The flange portion 36*a* serving as the limiting portion is provided integrally in the outer roller 36 and protruding from an axial end portion of the outer roller 36 toward an inner peripheral side of the outer roller 36, wherein the axial end portion of the outer roller 36 is located on a side of a distal end of a corresponding one of the trunnions 24*a*. The annular groove 36*b* is provided in another axial end portion of the outer roller 36, wherein the other axial end portion of the outer roller 36 is located on a side of a proximal end of the corresponding one of the trunnions 24*a*. Each of the three guide slots 26*c* of the outer ring 26 is provided with a pair of recessed grooves 26g that are opposed to each other in a width direction of the guide slot 26c that is elongated in the direction parallel to the rotation axis C2. The outer roller 36 has a convex outer-circumferential surface 36c that is fitted between the pair of recessed grooves 26g. It is noted that the snap ring 38, which is fitted in the annular groove 36b of the outer roller 36, can be interpreted to serve as a second limiting portion which is spaced apart from the flange portion 36a serving as a first limiting portion by a predetermined spacing distance in the axial direction of the outer roller 36, so as to cooperate with the flange portion 36a as the first limiting portion to limit the movements of the cylindrical rolling elements 34 and the inner roller 32 that are located between the first and second limiting portions in the axial direction of the outer roller 36.

The outer roller 36 of each of the three roller units 30 is linearly movable along the recessed grooves 26g of a corresponding one of the three guide slots 26c. Further, each of the three trunnions 24a having the convex outer-circumferential surface 24b are pivoted or have a circular motion with increase of the joint angle θ. A contact or tangent point T, at which the cylindrical inner circumferential surface 32a of the trunnion 24a is in contact with the cylindrical inner circumferential surface 32a of the inner roller 32, is reciprocatively moved during rotation of the constant velocity joint 20, relative to a tangent line L which is tangent to an imaginary circle PC and which is perpendicular to the center line C3, wherein the imaginary circle PC has a center lying at the rotation axis (inner ring axis) C1 and passes a center M of the above-described part-spherical surface defining the convex outer-circumferential surface 24b. The inner roller 32 is moved in the direction of the center line C3 (in the axial direction of the outer roller 36) owing to friction generated between its cylindrical inner circumferential surface 32a and the convex outer-circumferential surface 24b of the trunnion 24a which is moved and which is in contact with the cylindrical inner circumferential surface 32a of the inner roller 32.

Figure 4:
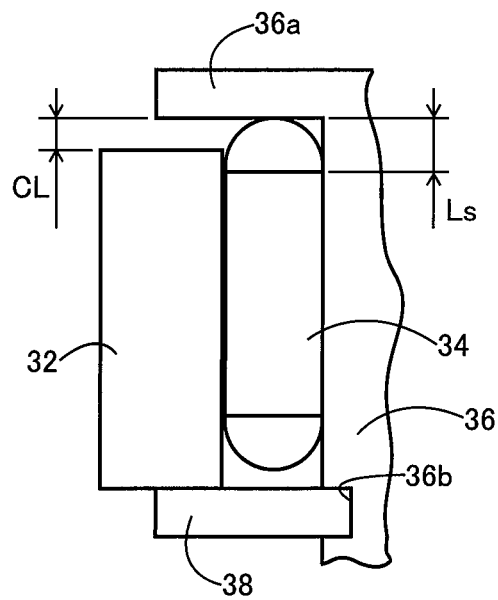
FIG. 4 is a cross sectional view schematically showing a clearance between an inner roller and a limiting portion of an outer roller that are included in the tripod constant-velocity joint shown in FIG. 1, in a direction parallel to the center line of the trunnion.

FIG. 4 is a view schematically showing a clearance CL between the inner roller 32 and the flange portion 36a of the outer roller 36 in the direction of the center line C3 of the trunnion 24a (in the axial direction of the outer roller 36). The inner roller 32 and the rolling elements 34 are limited, by the flange portion 36a and the snap ring 38, from being moved relative to the outer roller 36 in the direction of the center line C3 (in the axial direction of the outer roller 36). That is, the inner roller 32 and the rolling elements 34, which serve as the respective first and second limiting portions, cooperate with each other to inhibit the outer roller 36 from being moved by a predetermined distance or more. The clearance CL shown in FIG. 4 is set to a value that allows the inner roller 32 to be moved relative to the outer roller 36 by a distance shorter than the predetermined distance. The clearance CL corresponds to a value obtained by subtracting an axial length of the inner roller 32 from the above-described predetermined spacing distance between the inner roller 32 and the rolling elements 34 in the direction of the center line C3 (in the axial direction of the outer roller 36).

Figure 5:
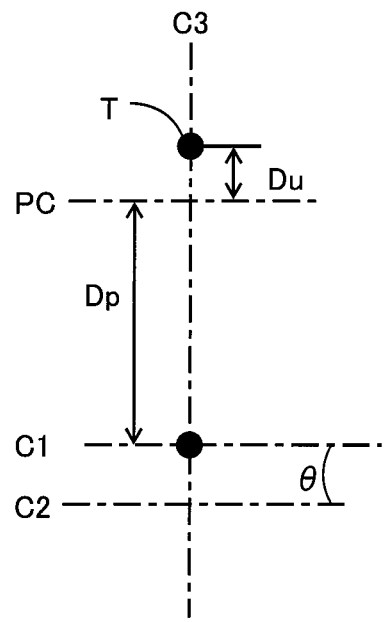
FIG. 5 is a schematic view for explaining a distance by which a tangent point (at which the inner roller and the trunnion are in contact with each other) is to be moved relative to a center of the trunnion so as to reach an upper stroke end of a reciprocating movement of the tangent point, in the tripod constant-velocity joint shown in FIG. 1.

FIG. 5 is a view showing a distance Du between the tangent point T and the above-described tangent line L (which is tangent to the imaginary circle PC and which is perpendicular to the center line C3) when the tangent point T is in an upper stroke end of the reciprocating movement. This distance Du corresponds to a distance by which the tangent point T (at which the trunnion 24a and the inner roller 32 are in contact with each other) is to be moved relative to the center M of the above-described part-spherical surface defining the convex outer-circumferential surface 24b so as to reach the upper stroke end of the reciprocating movement. As shown in FIG. 5, the tangent point T is located on an outer peripheral side of the imaginary circle PC, and the distance Du is expressed by expression (1) given below, where "Dp" represents a radius of the imaginary circle PC and "θ" represents the joint angle. It is noted that the joint angle θ is defined as an angle between the center line C3 and a line connecting between the center of the imaginary circle PC and the center M of the convex outer-circumferential surface 24b, namely, an angle between the rotation axis C1 of the inner ring 24 and the rotation axis C2 of the outer ring 26.

$$Du=[(1-\cos\theta)/4\cos\theta]\cdot Dp \quad (1)$$

Figure 6:
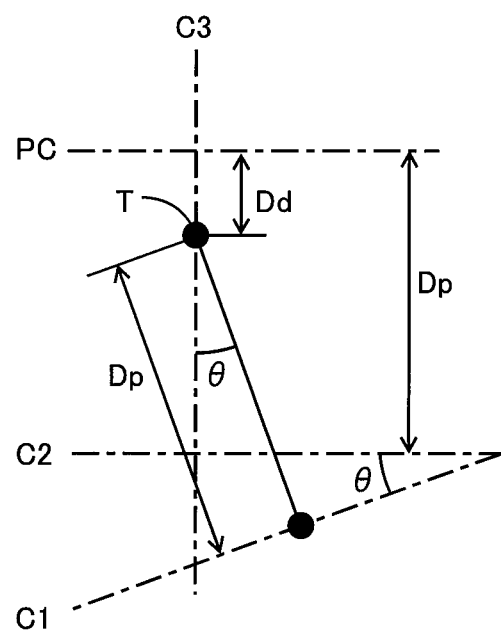
FIG. 6 is a schematic view for explaining a distance by which the tangent point is to be moved relative to the center of the trunnion so as to reach a lower stroke end of the reciprocating movement of the tangent point, in the tripod constant-velocity joint shown in FIG. 1.

FIG. 6 is a view showing a distance Dd between the tangent point T and the above-described tangent line L (which is tangent to the imaginary circle PC and which is perpendicular to the center line C3) when the tangent point T is in a lower stroke end of the reciprocating movement. This distance Dd corresponds to a distance by which the tangent point T (at which the trunnion 24a and the inner roller 32 are in contact with each other) is to be moved relative to the center M of the above-described part-spherical surface defining the convex outer-circumferential surface 24b so as to reach the lower stroke end of the reciprocating movement. As shown in FIG. 6, the tangent point T is located on an inner peripheral side of the imaginary circle PC, and the distance Dd is expressed by expression (2) given below, where "Dp" represents the radius of the imaginary circle PC and "θ" represents the joint angle.

$$Dd=(3/4)\cdot(1-\cos\theta)\cdot Dp \quad (2)$$

A stroke distance D of the reciprocating movement of the tangent point T (at which the convex outer-circumferential surface 24b of the trunnion 24a and the cylindrical inner circumferential surface 32a of the inner roller 32 are in contact with each other) corresponds to a sum of the above-described distances Du, Dd (i.e., D=Du+Dd). In the constant velocity joint 20 according to the present embodiment, the clearance CL between the inner roller 32 and the flange portion 36a of the outer roller 36 is set to a value that satisfies the following expression:

D6<CL<Ls, where "D6" represents the stroke distance D of the reciprocating movement of the tangent point T when the joint angle θ is 6 degrees that is a normal angle value in a practical use of the constant velocity joint 20, and "Ls" represents an axial length of a crowned end portion (parabolic-curvature end portion) of each of the cylindrical rolling elements 34.

A normal angle value θn is a value of the joint angle θ in the most frequent case in which an average weight load acts on the vehicle, for example, in a case in which one person rides on the vehicle or a predetermined weight load acts on the vehicle. That is, the clearance CL is set to the value that is larger than the stroke distance D6 of the reciprocating movement of the tangent point T when the joint angle θ is 6 degrees, because, in a vehicle adaptation study that was made in view of a rolling fatigue life and a noise/vibration performance of the tripod constant-velocity joint, it was determined that the constant velocity joint 20 should be adapted for a vehicle in which the joint angle θ of the constant velocity joint 20 is 6 degrees or less in the case in which one person rides on the vehicle or a predetermined weight load acts on the vehicle.

It is noted that an upper threshold value of the clearance CL may be smaller than a smaller one of the axial length Ls (of the crowned end portion of each of the cylindrical rolling elements 34) and the stroke distance D10 of the reciprocating movement of the tangent point T when the joint angle θ is 10 degrees. That is, the clearance CL may be set to a value that satisfies the following expression:

D6<CL<Min (D10, Ls), where "D10" represents the stroke distance D of the reciprocating movement of the tangent point T when the joint angle θ is 10 degrees.

For example, where the axial length Ls (of the crowned end portion of each of the cylindrical rolling elements 34) is larger than the distance D10, the clearance CL may be a set to a value that satisfies the following expression:

$$D6<CL<D10$$

Figure 7:
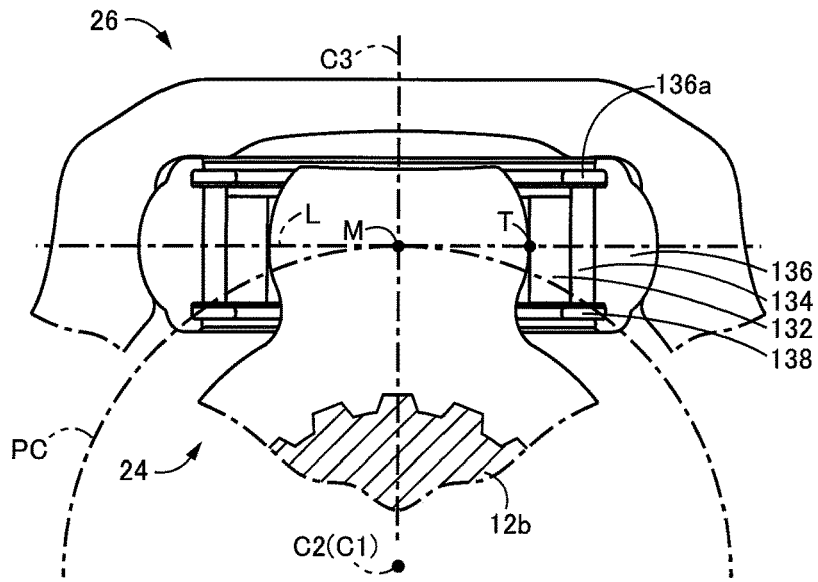
FIG. 7 is a is a view corresponding to the view of FIG. 3 and showing a cross section of a tripod constant-velocity joint of a comparative example.

FIG. 7 is a view corresponding to the view of FIG. 3 and showing a tripod constant-velocity joint of a comparative example. In the constant velocity joint (tripod constant-velocity joint) 20 according to the present embodiment, as shown in FIG. 3, the first limiting portion is constituted by the flange portion 36a that is provided integrally in the outer roller 36 and protruding from the outer roller 36 toward the inner peripheral side of the outer roller 36. On the other hand, in the tripod constant-velocity joint of the comparative example shown in FIG. 7, the first limiting portion is constituted by a snap ring 136a, so that an inner roller 132 and cylindrical rolling elements 134 are located between the snap ring 136a and a snap ring 138 and are inhibited from being moved relative to an outer roller 136 in the direction of the center line C3 (in the axial direction of the outer roller 136) by a predetermined distance or more. A clearance is provided between the inner roller 132 and the snap ring 136a to allow the inner roller 132 to be moved relative to the outer roller 136 by a distance shorter than the predetermined distance. In the construction of the tripod constant-velocity joint shown in FIG. 7, a function of preventing removal of the inner roller 132 is established by the two snap rings, thereby causing increase of the number of required components. Consequently, the increase of the number of the required components is likely to cause the clearance to be made too small due to dimensional variation.

Figure 8:
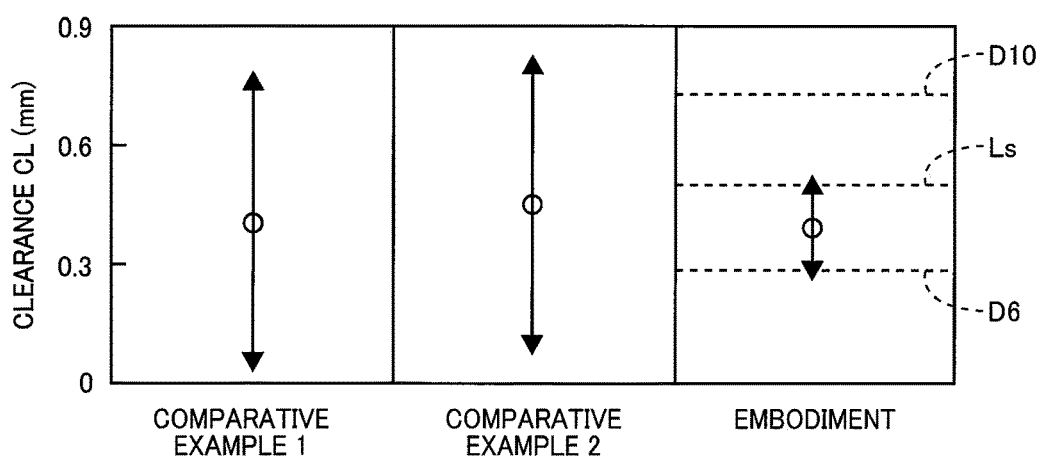
FIG. 8 is a view showing the clearance in the tripod constant-velocity joint shown in FIG. 1 and the clearance in the tripod constant-velocity joint shown in FIG. 7, in a comparative manner.

FIG. 8 is a view showing the clearance in comparative examples 1 and 2 that are constructed as shown in FIG. 7 and also in the present embodiment constructed as shown in FIG. 3, in a comparative manner. In FIG. 8, "▼" indicates a lower limit value of the clearance, "▲" indicates an upper limit value of the clearance, and "○" indicates the median of the clearance. As shown in FIG. 8, in the comparative examples 1 and 2, a range between the lower and upper limit values of the clearance is large and variation of the clearance is large. On the other hand, in the embodiment shown in a right end part of FIG. 8, a range between the lower and upper limit values of the clearance CL is small, and variation of the clearance CL is small although not being shown in the drawings.

As described above, the tripod constant velocity joint 20 according to the present embodiment includes: the inner ring 24 attached to the intermediate shaft (leg shaft) 12; the three trunnions 24a protruding from the inner ring 24 toward the outer peripheral side of the inner ring 24 and having the respective convex outer-circumferential surfaces 24b; the three roller units 30 rotatably supported by the respective three trunnions 24a; and the outer ring 26 storing the three roller units 30, wherein the inner ring 24 is disposed in the outer ring 26 such that the inner ring 24 is unrotatable relative to the outer ring 26 and is movable relative to the outer ring 26 in a direction of an outer ring axis about which the outer ring 26 is to be rotated. Each of the three roller units 30 includes: the inner roller 32 slidably fitted at the inner circumferential surface 32a thereof on the convex outer-circumferential surface 24b of a corresponding one of the three trunnions 24a, such that the inner circumferential surface 32a of the inner roller 32 and the convex outer-circumferential surface 24b of the corresponding one of the three trunnions 24a are in contact with each other at the tangent point T that is to be reciprocatively moved during rotation of the tripod constant-velocity joint 20; the plurality of cylindrical rolling elements 34 each including the crowned end portion in the axial end portion thereof; the outer roller 36 supported by the inner roller 32 through the plurality of cylindrical rolling elements 34 that are interposed between the inner roller 32 and the outer roller 36; and the flange portion 36a (limiting portion) provided integrally in the outer roller 36 and protruding from the outer roller 36 toward the inner peripheral side of the outer roller 36, so as to limit movements of the plurality of cylindrical rolling elements 34 and the inner roller 32. The inner roller 32 and the flange portion 36a cooperate to define therebetween the clearance CL in the direction of the center line C3 of a corresponding one of the three trunnions 24a, such that the clearance CL is smaller than the axial length of the crowned end portion of each of the plurality of cylindrical rolling elements 34, and is larger than the stroke distance of reciprocating movement of the tangent point T (at which the inner roller 32 and the corresponding one of the three trunnions 24a are in contact with each other) when the joint angle θ of the tripod constant-velocity joint 20 is the predetermined value. Owing to this construction, the inner roller 32 is not brought into contact with the flange portion 36a and accordingly the inner roller 32 is restrained from being brought into contact at its edge portion with rolling surfaces (columnar-shaped outer circumferential surfaces) of the respective rolling elements 34. It is therefore possible to retrain a compelling force applied from the inner roller 32 and to provide the tripod constant-velocity joint 20 with a high durability.

Further, in the tripod constant velocity joint 20 according to the present embodiment, the clearance CL between the inner roller 32 and the flange portion 36a of a corresponding one of the three trunnions 24a in the direction of the center line C3 of the corresponding one of the three trunnions 24a, is smaller than the stroke distance D10 of reciprocating movement of the tangent point T when the joint angle θ is 10 degrees. Owing to this feature, the clearance CL can be set to a value within an appropriate range.

Further, in the tripod constant velocity joint 20 according to the present embodiment, the predetermined value of the joint angle θ is a normal angle value θn that is a value of the joint angle θ in the most frequent case in a practical use of the tripod constant-velocity joint 20. For example, the normal angle value θn of the joint angle θ is 6 degrees. Owing to this feature, the clearance CL between the inner roller 32 and the flange portion 36a of a corresponding one of the three trunnions 24a in the direction of the center line C3 of the corresponding one of the three trunnions 24a, is set to a value larger than the stroke distance of reciprocating movement of the tangent point T when the joint angle θ is six degrees as the normal angle value θn, so that the inner roller 32 is restrained from being brought into contact at its axial end surface with the columnar-shaped outer circumferential surfaces of the respective rolling elements 34 at least when the joint angle θ is six degrees as the normal angle value θn, thereby making it possible to avoid a stress concentration on the columnar-shaped outer circumferential surface as the rolling surface of any of the rolling elements 34, which could be caused by contact of the edge of the inner roller 32 with the rolling surface.

While the preferred embodiment of this invention has been described in detail by reference to the drawings, it is to be understood that the invention may be otherwise embodied.

For example, in the constant velocity joint 20 according to the above-described embodiment, the inner ring 24 is splined to the end portion of the intermediate shaft 12. However, the inner ring 24 may be provided integrally with the intermediate shaft 12.

It is to be understood that the embodiment described above is given for illustrative purpose only, and that the present invention may be embodied with various modifications and improvements which may occur to those skilled in the art.

NOMENCLATURE OF ELEMENTS

12: intermediate shaft (leg shaft)
20: constant velocity joint (tripod constant-velocity joint)
24: inner ring
24a: trunnion
24b: convex outer-circumferential surface
26: outer ring (outer ring)
30: roller units
32: inner roller
32a: cylindrical inner circumferential surface
34: cylindrical rolling elements (rolling elements)
36: outer roller
36a: flange portion
C2: rotation axis of outer ring
C3: center line of trunnion
CL: clearance
D: stroke distance of reciprocating movement
Ls: axial length of crowned end portion
θ: joint angle

What is claimed is:

1. A tripod constant-velocity joint comprising:
an inner ring attached to a leg shaft;
three trunnions protruding from the inner ring toward an outer peripheral side of the inner ring, each of the three trunnions having a convex outer-circumferential surface;
three roller units rotatably supported by the respective three trunnions; and
a outer ring storing the three roller units,
wherein the inner ring is disposed in the outer ring such that the inner ring is unrotatable relative to the outer ring and is movable relative to the outer ring in a direction of an outer ring axis about which the cylindrical outer ring is to be rotated,
wherein each of the three roller units includes:
an inner roller slidably fitted at an inner circumferential surface thereof on the convex outer-circumferential surface of a corresponding one of the three trunnions, such that the inner circumferential surface of the inner roller and the convex outer-circumferential surface of the corresponding one of the three trunnions are in contact with each other at a tangent point that is to be reciprocatively moved during rotation of the tripod constant-velocity joint;
a plurality of cylindrical rolling elements each including a crowned end portion in an axial end portion thereof;
an outer roller supported by the inner roller through the plurality of cylindrical rolling elements that are interposed between the inner roller and the outer roller; and
a limiting portion provided integrally in the outer roller and protruding from the outer roller toward an inner peripheral side of the outer roller, so as to limit movements of the plurality of cylindrical rolling elements and the inner roller,
wherein the inner roller and the limiting portion cooperate to define therebetween a clearance in a direction of a center line of a corresponding one of the three trunnions, such that the clearance is smaller than an axial length of the crowned end portion of each of the plurality of cylindrical rolling elements, and is larger than a stroke distance of reciprocating movement of the tangent point when a joint angle of the tripod constant-velocity joint is a predetermined value,
wherein the joint angle of the tripod constant-velocity joint is defined as an angle between the outer ring axis and an inner ring axis about which the inner ring is to be rotated, and
wherein the clearance is larger than the stroke distance of reciprocating movement of the tangent point when the joint angle is 6 degrees.

2. The tripod constant-velocity joint according to claim 1, wherein each of the three roller units further includes, in addition to the limiting portion as a first limiting portion, a second limiting portion provided to protrude from the outer roller toward the inner peripheral side of the outer roller and spaced apart from the first limiting portion by a predetermined spacing distance in an axial direction of the outer roller,
wherein the second limiting portion cooperates with the first limiting portion to limit the movements of the plurality of cylindrical rolling elements and the inner roller that are located between the first and second limiting portions in the axial direction of the outer roller, and
wherein the clearance corresponds to a value obtained by subtracting an axial length of the inner roller from the predetermined spacing distance between the first and second limiting portions.

3. The tripod constant-velocity joint according to claim 1, wherein the clearance is smaller than the stroke distance of reciprocating movement of the tangent point when the joint angle is 10 degrees.

* * * * *